United States Patent [19]

Shochi et al.

[11] Patent Number: 4,673,173

[45] Date of Patent: Jun. 16, 1987

[54] WORKPIECE CLAMPING DEVICE

[75] Inventors: Toshiyuki Shochi; Kenei Nakajima, both of Toyama, Japan

[73] Assignee: Kabushiki Kaisha Nippei Toyama, Tokyo, Japan

[21] Appl. No.: 824,471

[22] Filed: Jan. 31, 1986

[51] Int. Cl.[4] .............................................. B23Q 3/08

[52] U.S. Cl. ....................................... 269/32; 269/93; 60/384

[58] Field of Search ................ 60/384, 387, 328, 459, 60/463; 269/27, 93, 91, 94, 238, 23, 32

[56] References Cited

U.S. PATENT DOCUMENTS 4,432,270 2/1984 Kyster et al. ........................ 60/384

4,538,797 9/1985 Lerch .................................. 269/93

*Primary Examiner*—Robert C. Watson

*Attorney, Agent, or Firm*—Sughrue, Mion, Zinn, Macpeak & Seas

[57] ABSTRACT

A workpiece clamping device with which workpieces of different sizes can be accommodated without having to make extensive system modifications each time the workpiece is changed and with which clamping operations can be performed with a high efficiency. An operating fluid flow-rate detector is provided in a hydraulic circuit between a hydraulic fluid source and a plurality of operating cylinders which drive clamping pawls to detect the flow rate and amount of the hydraulic fluid therethrough. The clamping position is sensed in accordance with the detected flow rate and amount.

2 Claims, 12 Drawing Figures

WORKPIECE CLAMPING DEVICE

BACKGROUND OF THE INVENTION

The present invention relates to a workpiece clamping device employed, for instance, at a station in a transfer machine. More particularly, the invention relates to an improved workpiece clamping device which controls operating cylinders used to clamp and support workpieces of different sizes on a workpiece mounting jig.

In a conventional workpiece clamping device of the same general type to which the invention pertains, in order to clamp, for instance, workpieces of different heights or to change the number of operating cylinders, it is necessary to change the pivot points of the workpiece clamping arms according to the heights of the workpieces. Furthermore, it is necessary to change the coupling points of the operating cylinders which are coupled to the workpiece clamping arms. In addition, the work system must be reconfigured; for instance, the positions and the number of detectors constituting limit switches and dogs for controlling the advancement, clamp and over-stroke positions of the operating cylinders must be changed.

In the case of a conventional detector used for detecting the operative positions of operating cylinders, it is necessary to provide at least two limit switches and two dogs, and addition of operations cannot be made without increasing the numbers of limit switches and dogs. As a result, the conventional workpiece clamping device suffers from the difficulties that it occupies a relatively large installation space, it has a high manufacturing cost, and is difficult to maintain.

In the case where a workpiece clamping device in a transfer machine or the like of a type which has a mounting device for inclining or turning a secured workpiece has limit switches and dogs for each operating clyinder, the workpiece clamping device requires intricate electrical wiring. In the case where limit switches and dogs are provided on the stationary bed, the positions thereof are fixed. Furthermore, if a workpiece clamping device detects clamping conditions from the operating pressure of the operating cylinders, the positions of the operating cylinders cannot be detected simultaneously therewith.

As described above, in the case where, for instance, workpieces of different heights are machined while clamping them with the same workpiece clamping device, the reconfiguration required in the work system, such as changing the pivot points of the workpiece clamping arms and changing the control device for the operating cylinders according to the heights of the workpiece to be machined, are considerably intricate, and as a result the work efficiency with such a system is considerably low.

SUMMARY OF THE INVENTION

In view of the foregoing, an object of the invention is to provide a workpiece clamping device in which the operations of the operating cylinders can be readily changed even in clamping workpieces of different sizes, the work system can be readily reconfigured, and workpiece clamping operations can be achieved with high efficiency.

The foregoing and other objects of the invention have been achieved by the provision of a workpiece clamping device having a fluid circuit arranged such that the operations of the operating cylinders are controlled by a single fluid flow-rate detecting means. In such an arrangement, operating cylinders for driving clamping pawls used to clamp a workpiece are provided on a workpiece mounting jig, and, according to the invention, operating fluid flow-rate detecting means for detecting the flow rate of the operating fluid of the operating cylinders is provided in the fluid circuit through which the operating cylinders are connected to a fluid supply source. Accordingly, the inventive workpiece clamping device is made compact, is simplified in construction, and is simple to maintain.

Figure 7:
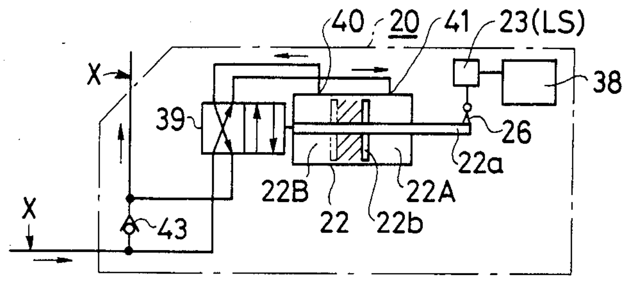
FIG. 7 is an explanatory diagram showing the operation of an operating fluid flow rate detector of FIG. 6.
Figure 9:
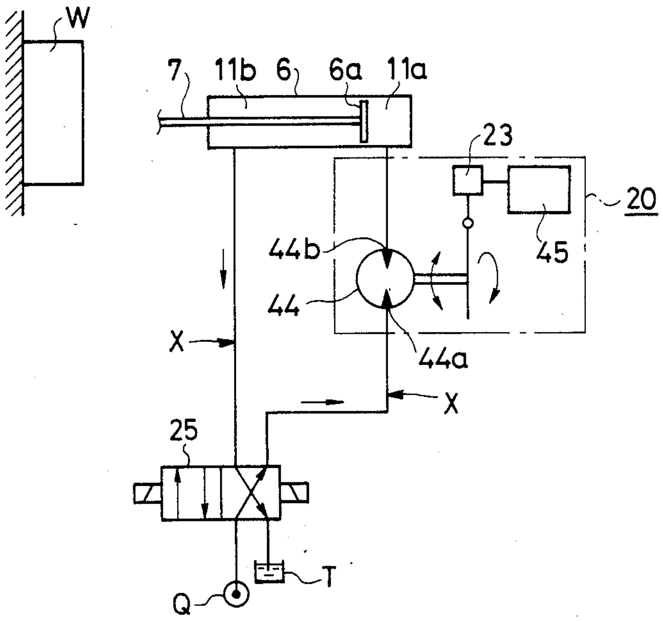
Figure 10:
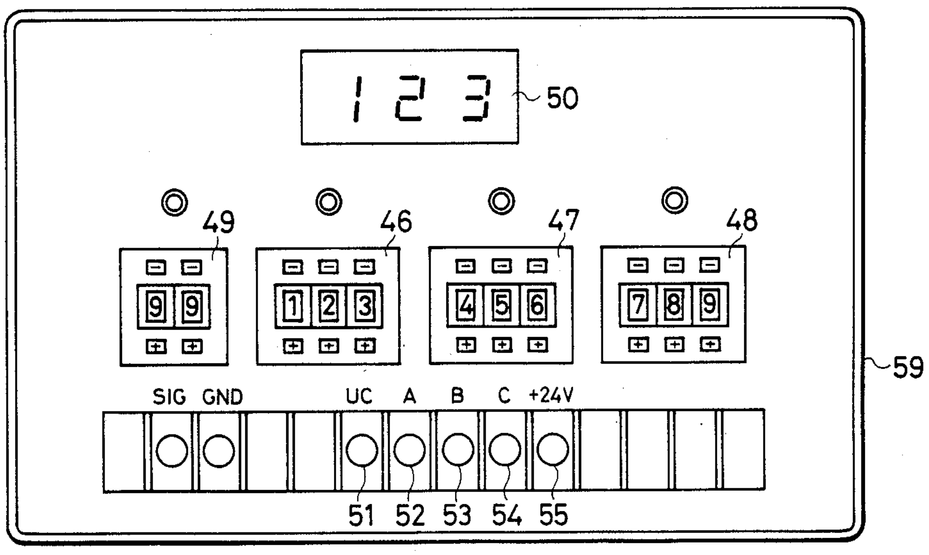

FIGS. **8*a* and 8*b* are sectional views showing a changing operation of the changing valve of FIG. 7**;

FIG. 9 is an explanatory diagram showing a fluid circuit in a fourth embodiment of the invention;

FIG. 10 is a front view showing the external controller of FIG. 9; and

Figure 11:
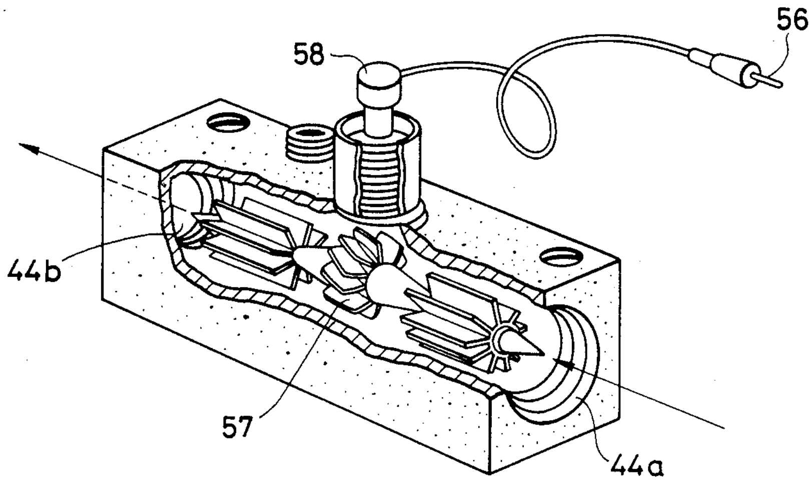

FIG. 11 is a partially fragmentary perspective view showing a flow rate meter of FIG. 9.

DESCRIPTION OF THE PREFERRED EMBODIMENTS

Preferred embodiments of the invention will be described with reference to the accompanying drawings.

Figure 1:
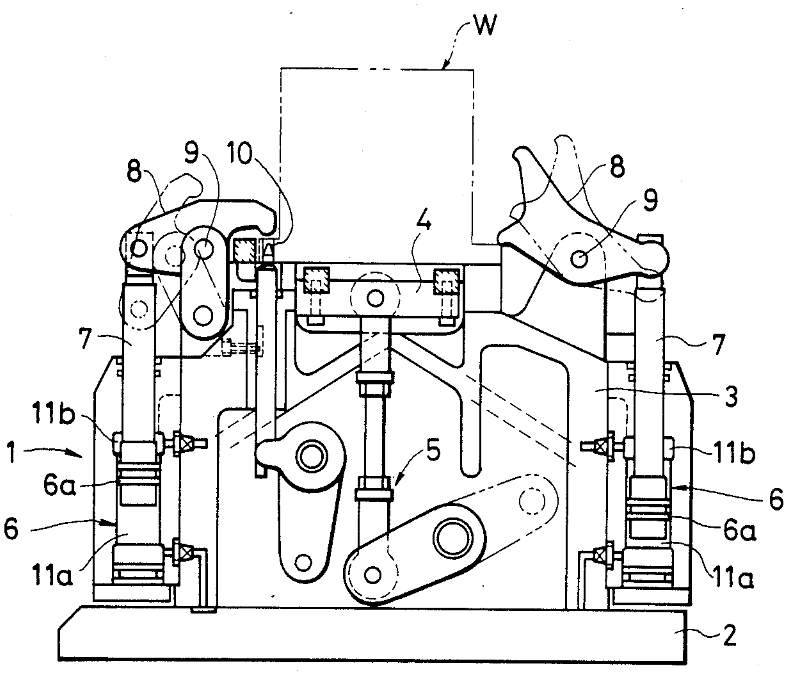
FIGS. 1 and 2 are, respectively, a front view and a plan view of a workpiece clamping device according to the invention.
Figure 2:
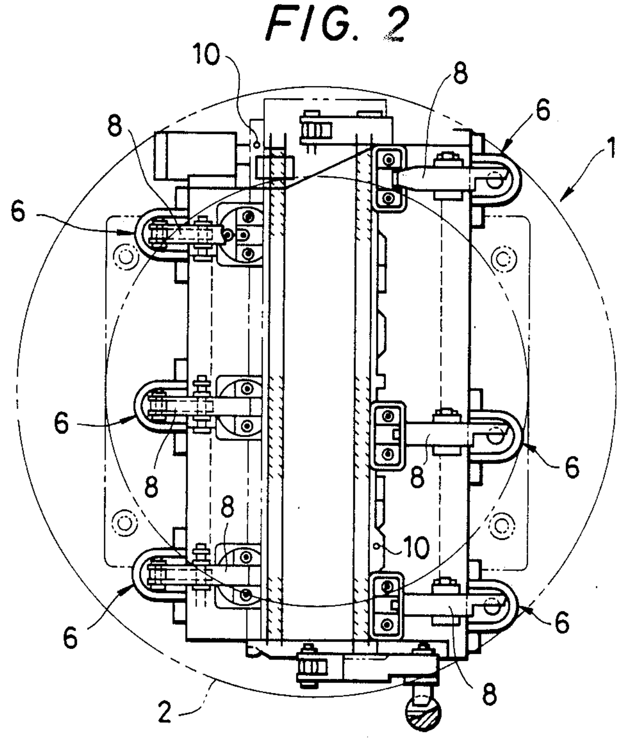

FIGS. 1 and 2 are, respectively, a front view and a plan view of a workpiece clamping device, provided at one station of a transfer machine, to which the technical concept of the invention is applied. As shown in FIGS. 1 and 2, the workpiece clamping device has a workpiece mounting jig 1. The jig 1 includes a workpiece placing stand 3 set on a base 2, and a supporting plate 4 adapted to support and lift a workpiece W, the supporting plate 4 being operated by a lifting mechanism 5.

A plurality of operating cylinders 6 (six operating cylinders in the embodiment shown in FIGS. 1 and 2) are disposed around the workpiece placing stand 3. The operating cylinders 6 have rods 7, the ends of which are coupled to the base parts of clamping pawls 8 adapted to clamp the workpiece W.

The clamping pawls 8 are mounted on pins 9 and rockably supported by the workpiece placing stand 3. A pair of locator pins 10, used to position the workpiece W, are mounted on the workpiece placing stand 3 in such a manner that it is movable in and out by a lifting mechanism (not shown).

Figure 3:
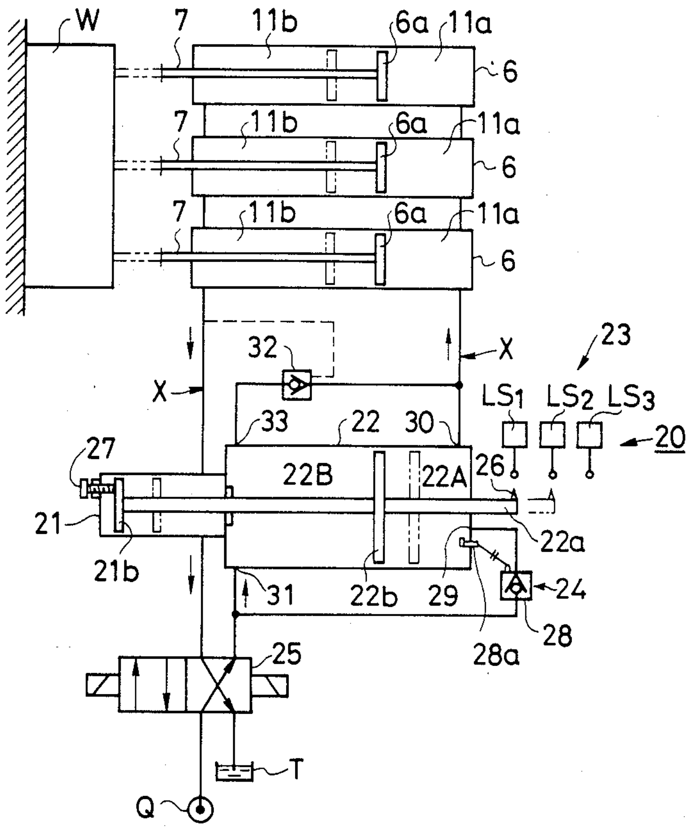
FIG. 3 is an explanatory diagram showing a fluid path with an operating fluid flow rate detector for controlling operating cylinders.

Each operating cylinder 6 is divided into an extension pressure chamber **11*a* and a retraction pressure chamber 11*b* by a piston 6*a*. The chambers 11*a* and 11*b* are connected to a fluid circuit X, which is connected to an operating-fluid supplying source Q (a hydraulic pressure supply source, for instance,) as shown in FIG. 3. In the fluid circuit X, an operating-fluid flow-rate decoder 20 is provided to detect the flow rate of the operating fluid in the circuit X or in the operating cylinder 6**.

Figure 4:
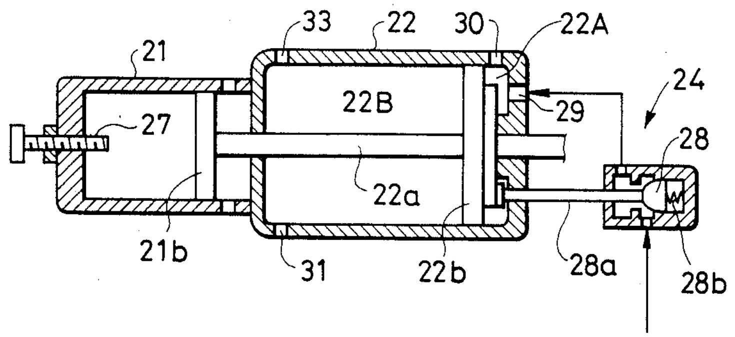
FIG. 4 is a sectional view of the essential components of the operating fluid flow rate detector of FIG. 3.

As shown in FIG. 4, an adjusting screw 27 for determining the retraction limit position of a piston 21*b* is disposed at the left end of a return cylinder 21. The retraction limit position of the piston 21*b* is adjustable by advancing or retracting the adjusting screw 27. The adjusting screw 27 is used to set the quantity of fluid required for operating the operating cylinders 6.

An opening-closing rod 28*a* of a valve 28, which is a component of a leakage compensator 24, is projected into the flow rate measuring cylinder 22 at the right end of the latter. The rod 28*a* is normally urged in the leftward direction of FIG. 4, and therefore the valve 28 is normally closed. Specifically, when oil leakage occurs in the fluid circuit X or in the operating cylinders 6 for some reason, the hydraulic pressure inside of the pressure chamber 22A of the flow rate measuring cylinder 22 is decreased. The piston rod 22*a* is pushed by the hydraulic pressure of the pressure chamber 22B to the stroke end, that is the right end of the cylinder 22.

Thereupon, the piston 22*b* pushes the opening-closing rod 28*a* in the righward direction against the force of the spring 28*b* so that the valve 28 is opened, as shown in FIG. 4. The hydraulic pressure from the supply source Q is applied through the leakage compensator 24, the inlet 29, the chamber 22A and the outlet 30 to the pressure chambers 11*a* of the operating cylinders 6 to maintain the clamping pressure of the cylinders 6.

As shown in FIG. 3, a dog 26 provided on the end of the piston rod 22*a* of the flow rate measuring cylinder 22 is contactable with limit switches LS1, LS2, LS3, etc. The positions of the limit switches LS1, LS2, LS3, etc., are adjusted so as to correspond to the retraction position, the clamping position, the over-stroke position, etc., respectively, of the operating cylinders 6, and are used to detect the respective positions. The limit switches LS1, LS2, LS3, etc., form the detector 23.

In the construction described above, while a workpiece W is clamped, hydraulic pressure from the supply source Q is applied through the port 31 to the pressure chamber 22B of the operating fluid flow rate measuring cylinder 22 so that the piston 22*b* is pushed in the rightward direction, as shown in FIG. 3. The hydraulic fluid in the pressure chamber 22A is discharged through the port 30 and flows through the fluid circuit X into the pressure chambers 11*a* of the operating cylinders 6. As the volume of the hydraulic fluid in the chamber 22B is increased, the piston rod 22*a* is moved in the rightward direction and the piston rods 7 of the cylinders 6 are moved to the left. When the operating ends of the piston rods 7 are brought into contact with the workpiece W, as shown by the dotted lines in FIG. 3, the movement of the piston rod 22*a* to the right is stopped at the position indicated by the dotted lines. At this time, the dog 26 of the piston rod 22*a* contacts the limit switch LS2 to detect the workpiece clamping condition.

In order to retract the pistons of the operating cylinders 6, a solenoid valve 25 is set so as to apply hydraulic pressure from the supply source Q through the return cylinder 21 to the pressure chamber 11*b*. The hydraulic fluid in the pressure chamber 11*b* pushes the pistons 6*a* in the rightward direction to discharge the hydraulic fluid in the chambers 11*a*. The hydraulic fluid from the chamber 11*a* flows through the port into the pressure chamber 22A. The hydraulic fluid in the pressure chamber 22B flows through the port 31 and the solenoid valve 25 to an oil tank T. Simultaneously the hydraulic fluid in the chamber 22B flows through a pilot operated check valve 32 (which is opened by the hydraulic pressure from the return cylinder 21) and the port 30 into the chamber 22A, too. In this operation, the piston 21*b* is moved to the left by the hydraulic pressure in the return cylinder 21, and the piston rod 22*a* is also moved to the left. When the operating cylinders 6 are moved to the retraction position, the movement of the piston rod 22*a* in the leftward direction is stopped by the adjustment screw 27 and the dog 26 is brought into contact with the limit switch LS1, as shown by the solid lines in FIG. 3, so that the retraction position of the pistons of the operating cylinders 6 is detected.

As is apparent from the above description, in the above-described embodiment, one flow rate measuring cylinder 22 is provided for all of the operating cylinders 6, and the operating fluid discharged from the flow rate measuring cylinder 22 is detected from the stroke of the piston rod 22*a*, whereby the retraction position, the clamping position, the over-stroke position, etc., of the operating cylinders 6 are detected by a single operating fluid flow-rate detector 20.

Figure 5:
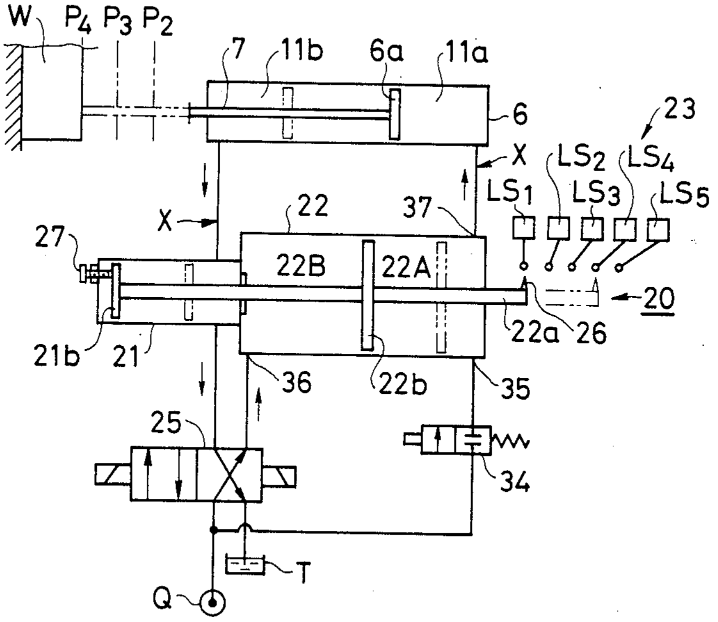
FIG. 5 is an explanatory diagram showing a fluid circuit in a second embodiment of the invention.

FIG. 5 shows a second embodiment of the invention. In this embodiment, in correspondence to three different sizes of workpieces W, three different clamping positions of the operating cylinders 6 are detected by means of limit switches LS2, LS3 and LS4.

In this embodiment, leakage compensation for the cylinders 6 is carried out using a solenoid valve 34. When the dog 26 contacts the one of the limit switches LS2, LS3 and LS4 corresponding to the particular workpiece to be clamped, the solenoid valve 34 is opened and hydraulic pressure from the supply source Q is applied through the port 35 and the cylinder 22 to the pressure chambers 11*a* of the operating cylinders 6 to maintain the clamping pressure of the cylinders 6.

The other arrangement of the second embodiment is the same as in the above-described first embodiment, and hence a further detailed description thereof is omitted. Elements corresponding functionally to those in the first embodiment are designated by like reference numerals or characters.

In this construction, while the particular workpiece W is clamped, hydraulic fluid from the supply source Q is supplied through the port 36 into the pressure chamber 22B of the flow rate measuring cylinder 22. The piston 22*b* is pushed in the rightward direction and the hydraulic fluid in the pressure chamber 22A is discharged through the port 37 and flows into the pressure chambers 11*a* of the operating cylinders 6. The movement of the pistons 22*b* in the rightward direction is stopped when the piston rods 7 of the operating cylinders 6 contact the particular workpiece W, that is, when the piston rods 7 are moved to the one of the clamping position P2, P3 and P4 corresponding to the size of the workpiece W. At this time, the dog 26 contacts the one of the limit switches LS2, LS3 and LS4 corresponding to the clamping position to detect the clamping position of the cylinders 6.

As described above, when the dog 26 contacts the limit switch corresponding to the clamping position of the particular workpiece W, the solenoid valve 34 is opened and hydraulic pressure is applied through the pressure chamber 22A of the cylinder 22 to the pressure chambers 11*a* of the operating cylinders 6 to compensate for leakage which may occur after the workpiece is clamped.

In order to retract the pistons of the cylinders 6, the solenoid valve 25 is changed to apply hydraulic pressure from the supply source Q through the return cylinder 21 to the pressure chambers **11*b* so that the pistons 6*a* are pushed to the right. At this time, the solenoid valve 34 is discharged and the hydraulic pressure of the supply source Q through the port 35 into the chamber 22A is shutted. The hydraulic fluid in the pressure chamber 11*a* is discharged and flows through the port 37 into the pressure chamber 22A of the cylinder 22. The hydraulic fluid in the pressure chamber 22B flows through the port 36 to an oil tank T. The piston rod 22*a* is moved to the left by the pressure of the hydraulic fluid in the pressure chamber 22A and the return cylinder 21, and stopped when the dog 26 contacts the limit switch LS1 corresponding to the retraction position of the pistons of the cylinders 6**.

Figure 6:
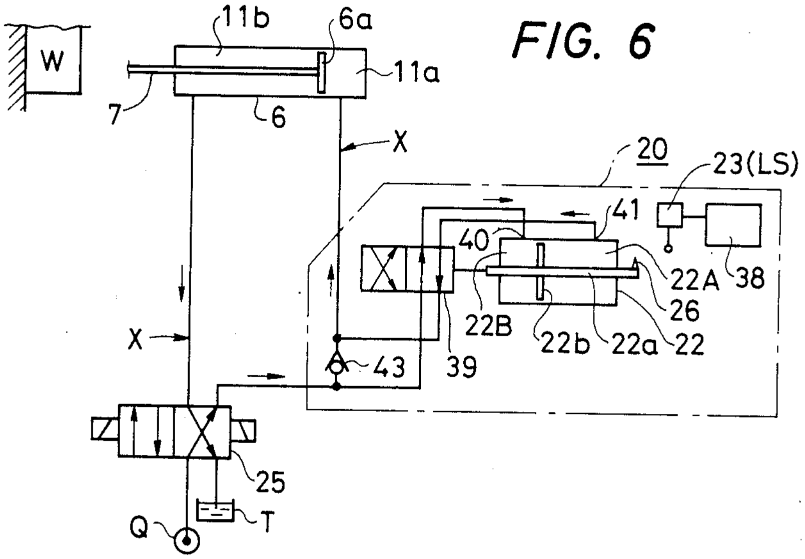
FIG. 6 is an explanatory diagram showing a fluid circuit in a third embodiment of the invention.

FIG. 6 shows a third embodiment of the invention. In this embodiment, a small flow rate measuring cylinder 22 is employed as a measuring unit for sensing the flow rate of the operating fluid. With this arrangement, a pulse is outputted every predetermined unit flow of hydraulic fluid to the plurality of operating cylinders 6, and these pulses are counted to detect the flow rate of the operating fluid.

In this third embodiment, the operating fluid flow rate detecting means comprises a fluid flow-rate cylinder 22, a detector 23 having a limit switch LS which contacts a dog 26 disposed on a piston rod **22*a*, the detector 23 detecting a predetermined stroke of the piston rod 22*a* and outputting pulses, a counter 38 for counting the pulses from the detector 23 (limit switch LS), and a mechanical operated changing valve 39 which is mechanically changed in position every predetermined stroke of the piston rod 22*a***.

Figure 8A:
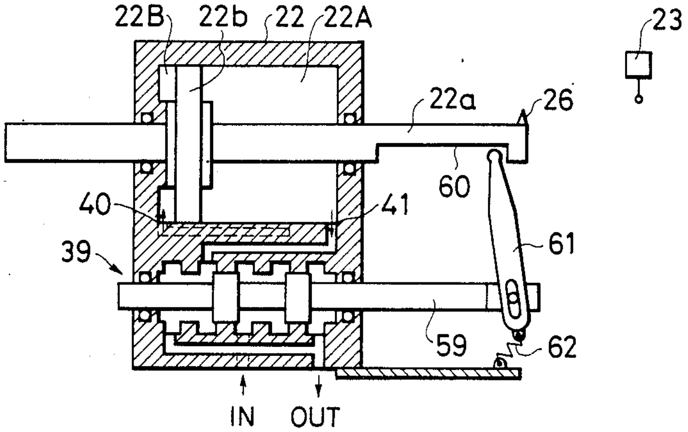
Figure 8B:
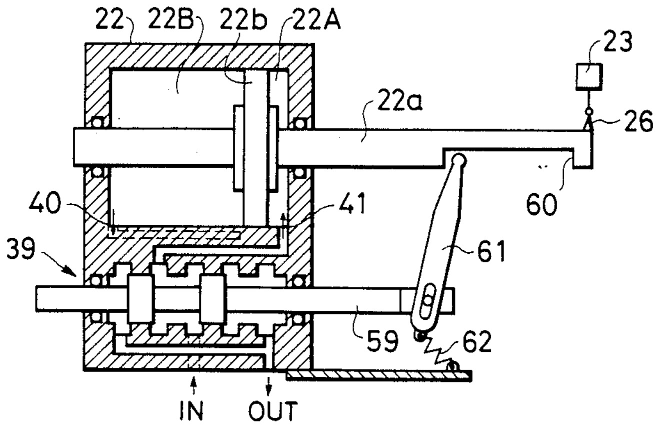

The changing valve 39 may be constructed as shown in FIGS. **8*a* and 8*b*, for example. A changing lever 61 is disposed at the end of an opening-closing rod 59 of the changing valve 39. The changing lever 61 engages a recess 60 of the piston rod 22*a* of the flow rate measuring cylinder 22 at the end portion of the former and is held at one of two settled positions by means of a spring 62. FIG. 8*a* shows the same state of a position of the piston 22*b* as that shown in FIG. 6. In the state shown in FIG. 8*a*, the hydraulic fluid from the supply source Q flows through a port 40 into the pressure chamber 22B and the hydraulic fluid in the pressure chamber 22A is discharged through a port 41. The piston 22*b* is moved to the right, and when the changing lever 61 is pushed by the left end of the recess 60, the changing lever 61 is rapidly changed by the spring 62 to move the opening-closing rod 59 to the left, as shown in FIG. 8*b*. At this time, the changing valve 39 is set to the state shown in FIG. 7, the hydraulic fluid from the supply source Q flows through the port 41 into the pressure chamber 22A, and the hydraulic fluid in the pressure chamber 22B is discharged out through the port 40**. The above-described operation is repeated. The other arrangement of the third embodiment is the same as in the above-described first embodiment, and hence a further detailed description thereof is omitted. Elements corresponding functionally to those in the first embodiment are designed by the like reference numerals or characters.

In this arrangement, as shown in FIG. 6, when a workpiece W is clamped, the hydraulic fluid from the supply source Q is supplied through the changing valve 39 and the port 40 into the pressure chamber 22B of the flow rate measuring cylinder 22. The piston **22*b* is pushed in the rightward direction so that the hydraulic fluid in the pressure chamber 22A is discharged through the port 41. The hydraulic fluid discharged from the pressure chamber 22A flows through the changing valve 39 into the pressure chambers 11*a* of the operating cylinders 6**.

As shown in FIG. 7, the piston rod **22*a* is moved to the right, and when the dog 26 contacts the limit switch LS, the changing valve 39 is changed. The hydraulic fluid from the supply source Q flows through the changing valve 39 and the port 41 into the pressure chamber 22A of the cylinder 22. The piston 22*b* is pushed to the left and the hydraulic fluid in the pressure chamber 22B is discharged through the port 40. The discharged hydraulic fluid from the pressure chamber 22B flows through the changing valve 39 into the pressure chambers 11*a* of the cylinders 6. When the piston 22*b* is moved to the position shown in FIG. 6, that is, in FIG. 8*a*, the changing valve 39 is changed and the direction of the hydraulic fluid flowing into and out of the cylinder 22** is changed.

The above-described operations are repeated. Every time the dog 26 contacts the limit switch LS, a detector 23 having the limit switch LS outputs the signal which is counted by means of a counter 38. The amount of the hydraulic fluid flowing into the pressure chambers **11*a* in the interval of two adjusted signals is a fixed value, namely, two times as large as the volume shown by the shaded portion of the cylinder 22 in FIG. 7. The total amount of the hydraulic fluid supplied into the cylinders 6 is the product of the above-described fixed value and the number of the signals counted. The total amount of the hydraulic fluid supplied into the cylinders 6 is established as the amount which is required for pushing the piston rods 7 to the position for clamping the workpiece W. Therefore, the number of the signals to be counted until the workpiece W is clamped is accordingly determined. Workpiece clamping is detected when the counter 38** counts the above-described predetermined number of the signals.

At this time, the movement of the piston **22*b* is stopped when the piston rods 7 of the operating cylinders 6 contact the workpiece W. Specifically, when oil leakage occurs in the fluid circuit X of in the operating cylinders 6 for some reason, the hydraulic pressure of the pressure chamber 22A or 22B is decreased. The piston 22*b* is moved by the hydraulic pressure to supply through the changing valve 39 into the pressure chambers 11*a* of the cylinders 6** to maintain the clamping pressure.

In order to retract the piston rods 7 of the operating cylinders 6, the solenoid valve 25 is set to apply the hydraulic pressure from the supply source Q to the pressure chambers **11*b* of the cylinders 6. The pistons 6*a* are pushed to the right, and the hydraulic fluid in the pressure chambers 11*a* is discharged through the check valve 42**.

In this third embodiment, the flow rate measuring cylinder 22 is small, making the system more compact.

FIG. 9 shows a fourth embodiment of the invention. In this above-described first through third embodiments, piston-type operating-fluid flow-rate detectors 20 are employed. On the other hand, in the fourth embodiment, instead of the flow rate measuring cylinder 22, a hydraulic motor 44 is provided in the operating fluid flow-rate detector 20. The detector 23 detects the rotation rate of the hydraulic motor 44 disposed in the hydraulic circuit X, and the detector 23, having the limit switch LS, outputs pulse signals with a frequency proportional to the rate of rotation of the hydraulic motor 44. The pulse signals outputted from the detector 23 are counted by a counter 45. The counted number is used to detect the retraction position, the clamping position, the over-stroke position, etc., of the operating cylinders 6.

Instead of the counter 45, by provision of an external controller 59, as shown in FIG. 10, it is possible to detect a plurality (three) of different clamping positions in correspondence to a plurality (three) of different sizes of workpiece W to be clamped. The external controller 59 includes the above-described counter 45. Furthermore, the controller 59 has setters 46, 47 and 48. Each of the setters is used for clmaping the corresponding workpiece W. The counted number of pulses required for clamping a workpiece is determined according to the size of the workpiece W. Each of the setters 46, 47 and 48 is used to set a respective predetermined number of pulses for clamping the associated workpiece W. The number of pulses actually counted by the counter 45 is indicated by the indicator 50 disposed at the upper portion of the controller 59. A setter 49 is used to set the number of pulses required for unclamping a workpiece, that is, for retracting the pistons of the operating cylinders 6. Terminals 51, 52, 53 and 54 are used to choose the unclamping or clamping positions of the pistons of the cylinders 6 to be detected. The terminal 51 is used for detecting the unclamping position. Each of the terminals 52, 53 and 54 is used for detecting the corresponding clamping position. When the position of the piston to be detected is selected by the use of one of the terminals 51 through 54, a lamp disposed on the corresponding setter is lighted. The terminal 55 is connected with the power source. The above-described external controller 59 is applicable to the third embodiment described above, too.

In the operating fluid flow rate measuring means 20 of the fourth embodiment, a flow-rate meter, shown in FIG. 11, for example, is employed as a hydraulic motor 44. A terminal 56 of the flow-rate meter is connected to the external controller 59. The turbine blade 57 rotates according to the flow rate of the hydraulic fluid flowing in the flow-rate meter from the port 44*a* to the port 44*b*. A pickup 58 (as detector 23) detects the rotational rate of the turbine blade 57 and outputs pulse signals with a frequency proportional to the detected rotational value to the external controller 59. When the indicator 50 indicates the same number as the number set at the selected setter, the corresponding position of the rods 7 of the cylinders 6 is detected.

The fourth embodiment is advantageous in that, as the detection angle of rotation is decreased, the accuracy of detection is improved, and thus the operating cylinders can be more readily controlled. The other arrangement and functions of the fourth embodiment are the same as those of the first embodiment, and hence a further detailed description thereof is omitted. Elements corresponding functionally to those of the first embodiment are designated by the same reference numerals or characters.

In the third and foruth embodiments, hydraulic pressure from the supply source Q is supplied to the pressure chambers 11*a* while the operating cylinders 6 are operated to clamp a workpiece, and the operating-fluid flow rate detector 20 is provided with leakage compensation.

In the inventive workpiece clamping device in which the operating cylinders for driving the clamping pawls which clamp a workpiece are mounted on the workpiece mounting jig, a single operating-fluid flow-rate detector for detecting the flow rate of the operating fluid in the operating cylinder is provided in the fluid circuit through which the operating cylinders and the operating fluid supply source are connected to each other. Due to this arrangement, the invention has the following excellent effects and merits:

(a) As described above, the operating cylinders can be controlled by a single operating fluid flow-rate detector, which can be mounted to be readily adjusted. Therefore, even a workpiece clamping device having a plurality of operating cylinders can be controlled with only one flow rate detector. Accordingly, the workpiece clamping device is simple in construction and high in operability.

(b) As it is unnecessary to provide detectors, such as limit switches and dogs, and electrical wiring for each of the operating cylinders, the device is simple in arrangement.

(c) Even if the number of operating positions of the operating cylinders is increased, it is unnecessary to increase the number of detectors. Furthermore, as the flow rate of the operating fluid of the operating cylinders is detected to control the latter, the operating positions can be detected with high accuracy.

(d) As the workpiece clamping device of the invention is simple in construction, it has a low manufacturing cost and is simple to maintain.

We claim:

1. In a workpiece clamping device in which a plurality of operating cylinders driving clamping pawls adapted to clamp a workpiece are provided on a workpiece mounting jig and the operating cylinders are supplied with operating fluid from a fluid source through a fluid circuit, the improvement comprising: operating fluid flow-rate detecting means for detecting a flow rate of said operating fluid to said operating cylinders from said fluid source, said operating-fluid flow-rate detecting means being provided in said fluid circuit, wherein said operating-fluid flow-rate detecting means comprises a hydraulic motor and means for detecting a rate of rotation of said hydraulic motor, wherein said means for detecting a rate of rotation of said hydraulic motor comprises means for generating pulse signals with a frequency proportional to the rate of rotation of said hydraulic motor and means for counting the pulse signals outputted from said pulse signal generating means.

2. The workpiece clamping device of claim 1, wherein said means for detecting a rate or rotation of said hydraulic motor further comprises setting means for setting at least one of a plurality of predetermined number of pulses required to be counted by said counting means, said predetermined numbers being predetermined according to sizes or positions of corresponding workpieces.

* * * * *